(12) United States Patent
Zhang et al.

(10) Patent No.: US 8,234,113 B2
(45) Date of Patent: Jul. 31, 2012

(54) IDENTIFICATION OF PEOPLE USING MULTIPLE TYPES OF INPUT

(75) Inventors: Cha Zhang, Sammamish, WA (US); Paul A. Viola, Kirkland, WA (US); Pei Yin, Atlanta, GA (US); Ross G. Cutler, Redmond, WA (US); Xinding Sun, Redmond, WA (US); Yong Rui, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/221,640

(22) Filed: Aug. 30, 2011

(65) Prior Publication Data

US 2011/0313766 A1    Dec. 22, 2011

Related U.S. Application Data

(63) Continuation of application No. 11/425,967, filed on Jun. 22, 2006, now Pat. No. 8,024,189.

(51) Int. Cl.
*G10L 15/00* (2006.01)
(52) U.S. Cl. ......... 704/246; 704/250; 382/116; 382/118
(58) Field of Classification Search .................. 704/246, 704/250; 382/116, 118
See application file for complete search history.

(56) References Cited

U.S. PATENT DOCUMENTS

| | | | | |
|---|---|---|---|---|
| 5,412,738 | A * | 5/1995 | Brunelli et al. ................ | 382/115 |
| 2003/0088832 | A1* | 5/2003 | Agostinelli et al. .......... | 715/526 |
| 2004/0267521 | A1* | 12/2004 | Cutler et al. .................. | 704/202 |
| 2005/0228673 | A1* | 10/2005 | Nefian et al. .................. | 704/270 |
| 2005/0265607 | A1* | 12/2005 | Chang ........................... | 382/224 |
| 2008/0069403 | A1* | 3/2008 | Breed ........................... | 382/104 |

* cited by examiner

*Primary Examiner* — Daniel D Abebe

(57) ABSTRACT

Systems and methods for detecting people or speakers in an automated fashion are disclosed. A pool of features including more than one type of input (like audio input and video input) may be identified and used with a learning algorithm to generate a classifier that identifies people or speakers. The resulting classifier may be evaluated to detect people or speakers.

20 Claims, 7 Drawing Sheets ns of the process of detecting people or speakers.

IDENTIFICATION OF PEOPLE USING MULTIPLE TYPES OF INPUT

This application is a continuation of U.S. patent application Ser. No. 11/425,967, filed Jun. 22, 2006 now U.S. Pat. No. 8,024,189, titled "Identification of People Using Multiple Types of Input."

BACKGROUND

There are a wide variety of situations in which it is desirable to identify people, including people that are speaking, using systems that are, at least in part, automated. Some existing systems that identify speakers use audio—for example, they might use "sound source localization," which includes processing the input from multiple microphones in different locations to attempt to identify the direction or directions from which speech originates. Some other systems attempt to improve the accuracy of methods like sound source localization by performing "decision level fusion," where data from multiple inputs are combined at the point where decisions about person or speaker detection are made.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various technologies and techniques directed to the identification of people, including speakers. Such technologies and techniques include the identification of a pool of identifying "features" from multiple types of input, or modalities (paths through which a computing system can recognize input), including from both audio and video inputs; and the generation of a "classifier" that includes a subset of features from the pool of features where the subset of features is selected so that the classifier efficiently identifies regions where people or speakers might exist.

DETAILED DESCRIPTION

The present invention extends to various technologies and techniques directed to the identification of people, including speakers. More particularly, described herein are, among other things, methods and systems that facilitate the identification of people using multiple types of input where the multiple types of input are considered a beginning of the detection process, rather than being combined at the end of the detection process.

Figure 1:
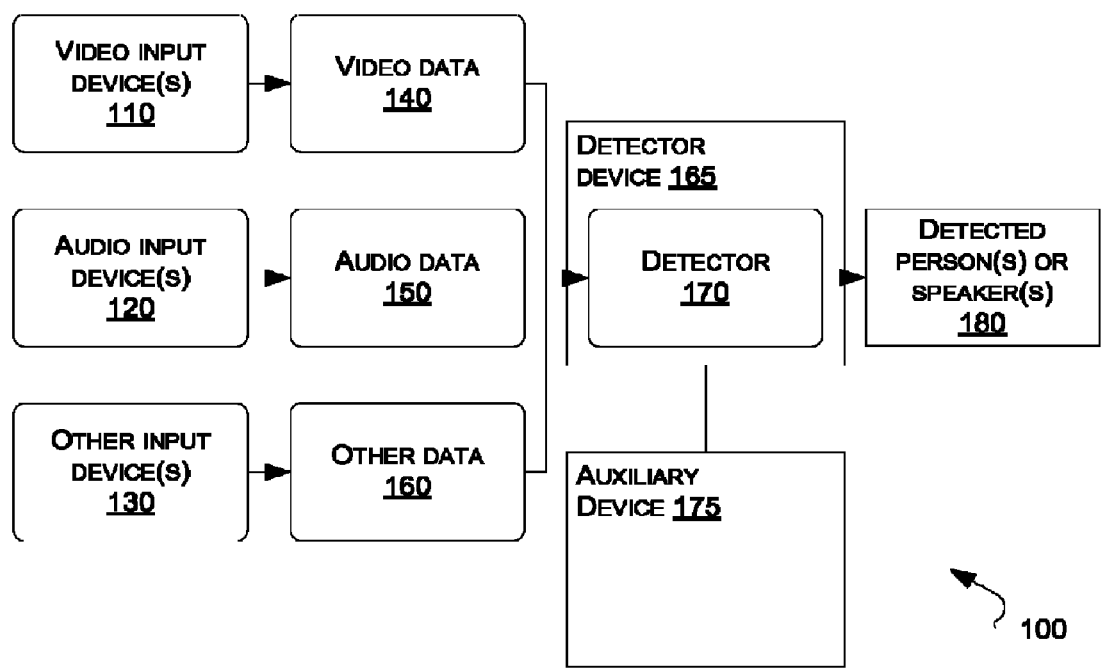
FIG. 1 illustrates an exemplary generalized diagram showing one system in which person detection might be accomplished.

Turning now to FIG. 1, illustrated therein is an exemplary generalized diagram showing one system 100 in which person detection might be accomplished. This description of FIG. 1 is made with reference to FIG. 10. However, it should be understood that the elements described with reference to FIG. 1 are not intended to be limited to being used with the elements described with reference to this other figure. In addition, while the exemplary diagram in FIG. 1 indicates particular elements, in some implementations not all of these elements may exist, and in some implementations additional elements may exist.

Included in FIG. 1 are one or more video input devices 110, one or more audio input devices 120, one or more other input devices 130, video data 140, audio data 150, other data 160, a person detector 170 implemented in a detector device 165, an auxiliary device 175, and the output of the person detector, any detected people or speakers 180.

The detector 170 accepts input, which it may then use to attempt to identify one or more people 180, including people that are speaking, or "speakers." The detector may use a variety of mechanisms to attempt to identify people, including those discussed in more detail herein. In some implementations the detector may execute detection mechanisms determined elsewhere, while in other implementations the detector may both determine and execute detection mechanisms. The detector may use a variety of inputs, including video data 140, audio data 150, and other data 160.

The one or more video input devices 110 may comprise a variety of video input devices, including a variety of cameras and camera types with a range of functionality. In one implementation, the video input devices 110 might include multiple cameras located in a circular arrangement so as to provide a 360° view. In other implementations the same 360° view might be provided by a single camera, perhaps with a single lens. In yet other implementations, the one or more video input devices might provide a view that covers a range of less than 360°.

At least part of the output of the one or more video input devices 110 is the video data 140. This data may include multiple single frames of video data, where each frame comprises an image made up of multiple pixels. For example, a camera that is capable of producing video at a rate of 30 video frames per second might produce as output 30 images each second. In some implementations, each image produced by the camera might be known as the "base image" (to differentiate it from other calculated images, like the short term difference and long term average images explained below). Note that the one or more video input devices 110 may provide data in a variety of forms, including in forms where all pixels of each video frame are not explicitly transmitted from the video input device. For example, the output of the one or more video input devices 110 might comprise a single initial video frame where values for all pixels in the frame are provided, and the output for at least some additional subsequent frames may only include changes from the initial frame. In this case the pixel-by-pixel representation for any subsequent frame may be determined by applying the changes to the original frame. In either case, each base image produced by the camera may be considered to include a full pixel-by-pixel image.

In addition, the video data 140 may also comprise additional calculated data. For example, in some implementations it may be useful to calculate a "short term difference" using multiple video frames. Such a short term difference may be useful, for example, to identify motion. While a short term difference may be calculated in a variety of ways, one possible method is to, for each pixel in the image, subtract the value of the pixel in the immediately preceding frame from the value of the pixel in the current frame. Contemporaneously, the method may also subtract the value of the pixel in the second immediately preceding frame from the value of the pixel in the current frame. Then, the minimum of the two subtraction operations may be taken as the current value for the pixel. For pixels where no motion exists—that is, for areas where the image remains the same—this method will tend to produce values close to zero. For pixels where there has been recent motion, this method may produce values that are in some cases much greater than zero. This specific method may be represented by the following equation, where $M_t$ is the short term difference image at time t and $I_t$ is the image from the camera at time t:

$$M_t = \min(|I_t - I_{t-1}|, |I_t - I_{t-2}|)$$

Note that, depending on the frame rate of the camera, the "preceding" frames used by this calculation may be more than just the two immediately preceding frames. For example, when using a camera with a frame rate of 30 frames per second, one may use the frames from 10 frames ago and 20 frames ago rather than the two immediately preceding frames.

In the same or other implementations it may be useful to calculate a "long term average" of video frames, which also might be a part of the video data 140. A long term average might identify portions of the region captured by the one or more video input devices 110 where motion has previously existed, even if the motion did not happen recently. While a long term average may be calculated in a variety of ways, one possible method is to compute a running average of short term difference images, perhaps including those produced by the short term difference method described previously. Using such a method, the long term average video frame may continually be updated so that each pixel in the frame is comprised of the average value of that pixel from all or many preceding short term difference image frames. For areas of the region captured by cameras where there has been little or no motion over the course of capturing the video, this method may tend to produce values that are close to zero. In contrast, for areas where there has been motion at some point in the past, which often includes areas of the region that contain people, this method may tend to produce non-zero values.

In addition, in some implementations, rather than considering calculated images, like the short term difference and long term average, from the most recent frame of video data, it may be useful to consider them as also including at least some "future" data. For example, the short term difference might use the current frame, the most recent preceding frame, and the "next frame" as input, by waiting until the next video frame is captured and then calculating the short term difference using these three identified frames. Any such operation may increase the latency of at least this part of the person detection process by the time necessary to capture the additional "future" data, but in some cases this increased latency may be offset by the data ultimately represented by the calculated image.

The video data 140 may comprise any or all of the images discussed previously, as well as additional images or video frames. These images may be provided from, or if required, computed in, a variety of locations, including the one or more video input devices 110, the detector 170, or any other device. In addition, while this discussion refers to "video," it is important to understand that any camera capable of producing images may be used, including those cameras not traditionally thought of as "video cameras." For example, a "still" camera capable of taking a number of photographs in sequence may be used in some implementations. Furthermore, if detecting motion is not deemed important, in some implementations a single still image may be used. In addition, in some cases additional data may be used. For example, the detector might use skin color as an additional means for identifying regions that might contain a person.

The one or more audio input devices 120 may comprise a variety of audio input devices, including a variety of microphones and microphone types with a range of functionality. In some implementations, the one or more audio devices may include a microphone array made up of multiple microphones located in different positions. Using a variety of information from such a set of microphones, including perhaps knowledge of the different positions of the microphones and differences in amplitude and arrival times for sounds detected by the microphones, the one or more audio input devices may provide data including directions from which sounds have originated. Such input is sometimes included as part of a technique called "sound source localization" (SSL). In some cases, such directional information may be useful when determining speakers.

The audio data 150 may in some implementations, with some amount of processing, include a "probability distribution function" that provides likelihood values that represent the probability that sound, including perhaps a speaker's voice, is coming from any particular direction. For example, if information from the one or more audio input devices 110 may be used to locate sound from any direction, the probability distribution function, also referred to as the SSL likelihood function herein, might contain a probability value for different azimuths, or directions. For those directions in which little or no sound is detected, the probability value may be low, while for those directions from which more sound is detected, the probability value may be high.

In some implementations, perhaps depending on the capabilities of the audio input devices 120, the audio data 150 may include additional information. For example, in some implementations the audio data might include the range or distance to sound sources and/or the elevation of sound sources. In some implementations, this data—like the range to sound sources and/or the elevation of sound sources—may also be associated with probability distribution functions.

The audio data 150 may comprise any or all of the data discussed previously, as well as additional data. This data may be provided from, or if required, computed in, a variety of locations, including in hardware associated with the one or more audio input devices 120, the detector 170, or any other device. For example, in some implementations sound source localization, perhaps producing an SSL likelihood function, may be performed using hardware associated with the one or audio input devices, may be performed using hardware associated with the detector, or may be performed using some other hardware or in some other location.

In some implementations, the video data 140 and the audio data 150 may be linked somehow so that directions associated with the video data may be correlated to directions associated with the audio data. For example, in such an implementation, the region of an SSL likelihood function from one azimuth to another might be correlated with a particular region in one or more video frames, identified perhaps by horizontal pixel locations. For example, in one implementation, the region from, say, 10° to 20°, might be correlated with pixels located, say, from horizontal pixel locations 100 to 200. Using such a correlation, information from the one or more audio input devices 120 may be used when identifying particular regions in the images provided by the one or more video devices 110, and vice versa. For audio data 150 that includes additional information, like elevation, the additional information may also be correlated with particular regions in the images. For example, elevation information may be correlated with vertical pixel locations. Similar types of correlation may also exist with any of the one or more other input devices 130, depending on the nature and operation of such devices.

In some implementations, additional types of input may exist and be used as part of the detection process. In some cases, these additional types of input might originate in one or more other input devices 130 and produce at least part of the other data 160. For example, one possible other input device might include a three-dimensional camera that is capable of providing some measure of the distance or depth to elements in an image.

The detector 170 may be implemented in a variety of computing devices, including in a detector device 165, as shown. In some implementations, this detector device may contain the necessary hardware for implementing person detection and may be, for example, connected to one or more video input devices and one or more audio input devices through a variety of connecting means, such as USB, any variety of network including wireless networks, and so on, as would be appreciated by one skilled in the art. In other implementations, the detector may be implemented in a detector device that includes one or more video input devices and one or more audio input devices, such as perhaps one or more video input devices 110 and one or more audio input devices 120. Any detector device may include a variety of processing elements, including general purpose central processing units (CPUs) and/or digital signal processor (DSP) units. One exemplary computing environment in which a detector might be implemented is described below, with reference to FIG. 10.

Regardless of whether the detector device 165 contains or is connected to elements like the one or more video input devices 110, the one or more audio input devices 120, and other input devices 130, the detector device may also in some implementations be connected to one or more auxiliary devices 175. In this context an auxiliary device may be any device that provides additional functionality that might be associated with or useful to the detector device 165. For example, in some implementations an auxiliary device might comprise a laptop computer that contains a hard drive on which the detector device might store captured video, audio, and possibly regions in which people or speakers have been detected. In the same or other implementations, the auxiliary device might provide computer processing cycles to the detector device so that, for example, the detector device may offload some or all of its detection processing to the auxiliary device. In yet other implementations, an auxiliary device might comprise solely a storage means—it might be, for example, a hard drive in a USB enclosure. In general, an auxiliary device may be connected to the detector device using any connecting means, including USB, any form of networking, and so on.

In some implementations, it may be important for data from different input devices to be synchronized. For example, the input from the one or more video input devices 110 may be synchronized with the input from the one or more audio devices 120.

Figure 2:
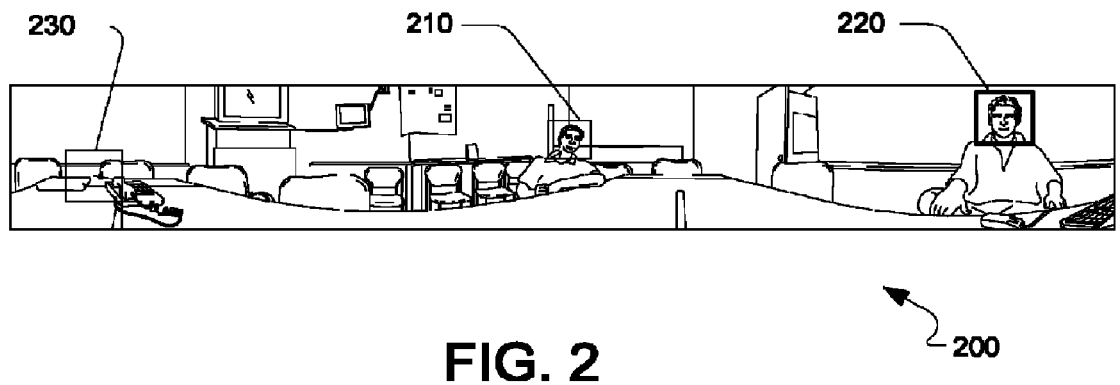
FIG. 2 illustrates a graphical representation of one exemplary image as well as exemplary regions that might be identified as containing people or speakers.

Turning now to FIG. 2, shown therein is a graphical representation of one exemplary image 200 as well as exemplary regions that might be identified as containing people or speakers. Included in the graphical representation are a first region 210 associated with a first identified person, a second region 220 associated with a second identified person, and a third region 230. This description of FIG. 2 is made with reference to FIG. 1. However, it should be understood that the elements described with reference to FIG. 2 are not intended to be limited to being used with the elements described with reference to this other figure. In addition, while the exemplary diagram in FIG. 2 indicates particular elements, in some implementations not all of these elements may exist, and in some implementations additional elements may exist.

The exemplary image 200 might represent one frame of video produced by one or more video input devices, including perhaps the one or more video input devices 110 described previously with reference to FIG. 1.

In some implementations, a detector, perhaps like the detector 170 of FIG. 1, might indicate identified people or speakers using horizontal and physical pixel locations that denote a rectangle or some other shape. For example, a detector might indicate that the first region 210 might have a high probability of being associated with a person or speaker. Similarly, and possibly contemporaneously, it might indicate that the second region 220 might also have a high probability of being associated with a person or speaker. As can be appreciated by examination of FIG. 2, in the case of the first region 210 and the second region 220, such a detector would be correct, in that each region contains a person. A detector might also identify the third region 230 as having a high probability of being associated with a person—perhaps, for example, because of reflection of sound from a wall or other surface. As a detector may only indicate probabilities that a particular region is associated with a person, in some cases the regions identified by a detector may not actually contain a person. The threshold or level at which a detector considers a region to contain a person may change and may be defined depending upon the application or use of the detector. For example, in some implementations such a threshold may be set to some relatively high value, which would presumably limit the number of regions that might be associated with a person while also perhaps limiting the number of regions that are ultimately misidentified.

The exemplary image 200 is intended for illustrative purposes and should not be interpreted to limit the scope of any claimed invention. Similarly, the representation of identified people and misidentified regions illustrate only one graphical means for showing identified and misidentified regions. Any means for representing or illustrating regions may be used.

Figure 3:
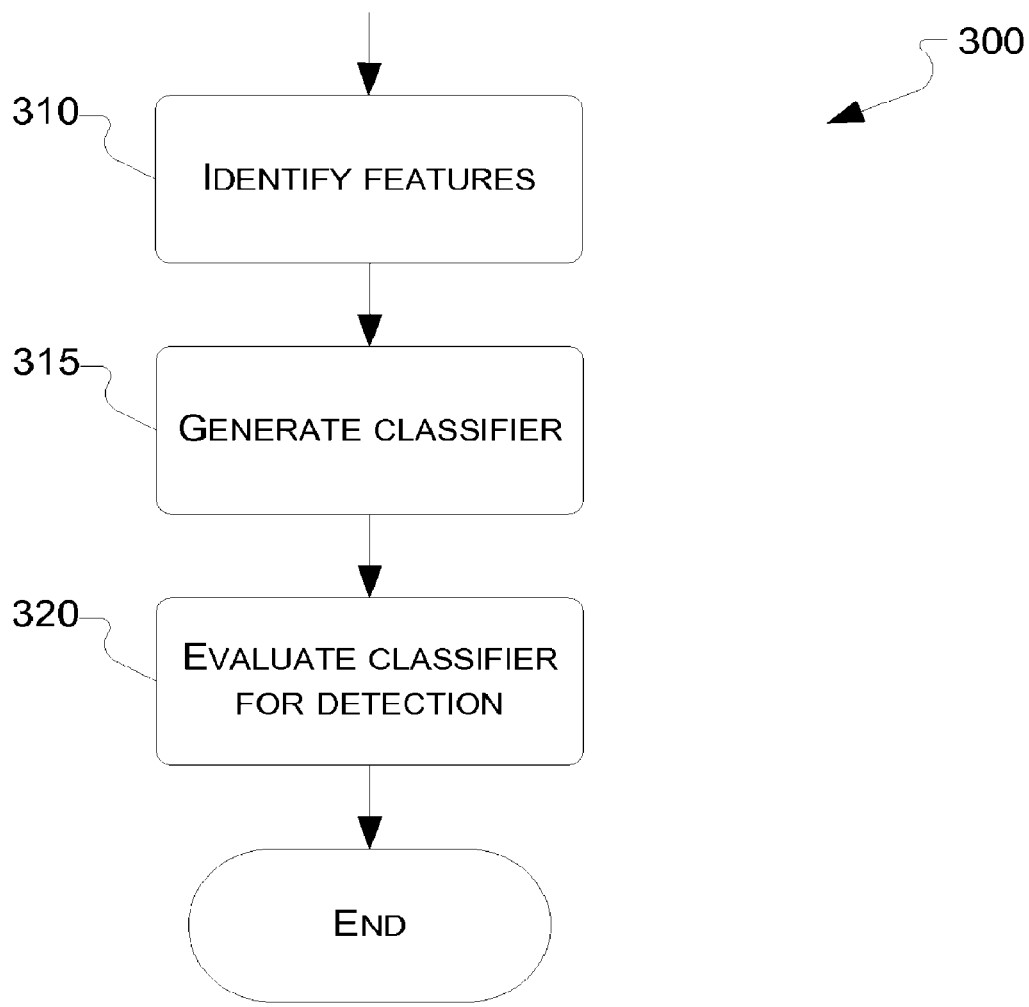
FIG. 3 illustrates an exemplary generalized operational flow including various operations that may be performed when identifying a person.

Turning now to FIG. 3, shown therein is an exemplary generalized operational flow 300 including various operations that may be performed when identifying a person. The following description of FIG. 3 is made with reference to additional figures, including FIG. 1, FIG. 4, FIG. 8, and FIG. 9. However, it should be understood that the operational flow described with reference to FIG. 3 is not intended to be limited to being used with the elements described with reference to these other figures. In addition, while the exemplary operational flow of FIG. 3 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In one implementation of operation 310, a pool of features is identified. The pool of features may then be used as input when executing the generate classifier operation 315. In this context, a feature is an entity associated with one or more types of input that serves to quantify some element of the input or inputs at a particular time. There may be audio features, video features, and other features associated with other types of input. For example, in the case of audio input that includes an SSL likelihood function, a feature might be defined, at least in part, by some kind of comparison of the "local" minimum and maximum values of the SSL likelihood function, compared to the "global" minimum and maximum values of the same SSL likelihood function (where "local" might refer to the values for a subset of the entire SSL likelihood function while "global" might refer to values for the entire SSL likelihood function). Depending on the values of the SSL likelihood function, different audio features will produce different numerical results. Some specific details applicable to some implementations relating to the features that might be used, including more information about features specific to audio and video inputs, are discussed in more detail below, for example with reference to FIG. 4.

The means by which the pool of features might be identified may vary depending on the nature of the features and the input(s) with which they are associated. Identifying features, as well as the manner in which features might be generated, is often the task of one or more designers with domain expertise applicable to the subject area for which the pool of features is to be generated. For example, the creation of an audio feature that is defined, at least in part, by a function that produces a number when given values from an SSL likelihood function might require thought on the part of a human designer who devises the audio feature.

In some cases, features might be chosen because they are believed to provide some information about the existence of a person or speaker. However, it is important to note that a feature does not necessarily have to provide a particularly "good" or always accurate result. The generate classifier operation 315, discussed below, may be used to select, through another process, the features most suitable for person and speaker detection.

In an exemplary implementation of such a generate classifier operation 315, a subset of the features identified in operation 310 may be selected to form a "classifier." As used herein, the term "classifier" refers to an entity that, when presented with inputs—including, in some implementations, audio and video inputs like those discussed elsewhere in this application—may provide an approximate result that provides some estimate of whether a particular region in an image contains a person or speaker.

Classifiers are often built or created using an automated process. For example, in some implementations classifiers may be created using some kind of "learning algorithm," which comprises a process that takes some input and produces an output that can classify or answer particular questions. The generated classifier generally consists of some subset of the features identified in operation 310, where the features in the subset have been selected by the learning algorithm to answer the question associated with the classifier. Depending on various needs, the features selected might answer the question more accurately, more efficiently, and so on. In some implementations, the features that are a part of the classifier might be located in the classifier in such a way so as to improve the operation of the classifier when used for detection. For example, preferable features might be ordered so that they are evaluated earlier in the classifier if their evaluation requires relatively less computational resources, or if such features are more highly correlated with a person or speaker than other features. Such ordering might be performed by weighting preferable features while the classifier is generated, by sorting the features in the classifier after the classifier has been generated, or through other means. Some specific details applicable to some implementations relating to the generation of classifiers using learning algorithms are described in more detail below, for example with reference to FIG. 7.

Once the classifier has been generated in operation 315, it can be used, in operation 320, to identify people or speakers. Generally, an implementation of operation 320 feeds input, such as audio and video, to the classifier, which uses the input to determine the likelihood that a person or speaker is present. In some implementations, one or more video frames may be provided as input and may be logically subdivided into regions of various sizes, and then the classifier may be evaluated on each of the subdivided regions. As used herein, each subdivided region may be known as a "detection window." For each detection window, a detector may evaluate some number of features in the classifier, ultimately determining to some level of confidence whether the particular region contains a person or speaker. In some implementations, after the detection windows have been evaluated for people or speakers, the most promising—in some cases, most likely—regions may be identified and output as being regions that contain a person or speaker. The most likely regions might be identified, in part, by choosing regions that have some relatively large number of positive detection windows. Some specific details applicable to some implementations relating to the use of a classifier to identify people or speakers, including detection windows, are described in more detail below, for example with reference to FIG. 8 and FIG. 9.

It is important to note that the operations illustrated with reference to FIG. 3 may be implemented or executed in a variety of different computing devices or platforms, including the use of multiple computing devices in the same implementation. For example, the identify features operation 310 and generate classifier operation 315 may be executed in association with one or more personal computer devices, while the evaluate classifier for detection operation 320 may be executed on device separate from the device or devices associated with, for example, the generate classifier operation. This includes, in at least one exemplary implementation, on a device like the detector device 165 illustrated in FIG. 1. It is also important to understand that some operations may be performed fewer or more times than other operations. For example, in some implementations it may be common for the identify features operation 310 and the generate classifier operation 315 to be executed some number of times, until a suitable classifier has been found. Then executable code that implements detection using that classifier, as exemplified by operation 320, may be implemented using some other device—including, for example, a camera device suitable for use in a conference room—and then executed repeatedly to actually detect people in speakers. In other implementations the generate classifier operation 315 and evaluate classifier for detection operation 320 may both be implemented in the same device. In such implementations, or in other implementations, the generate classifier operation may be executed for each new room or region where the device is used, and might produce distinct classifiers for each new room or region.

Figure 4:
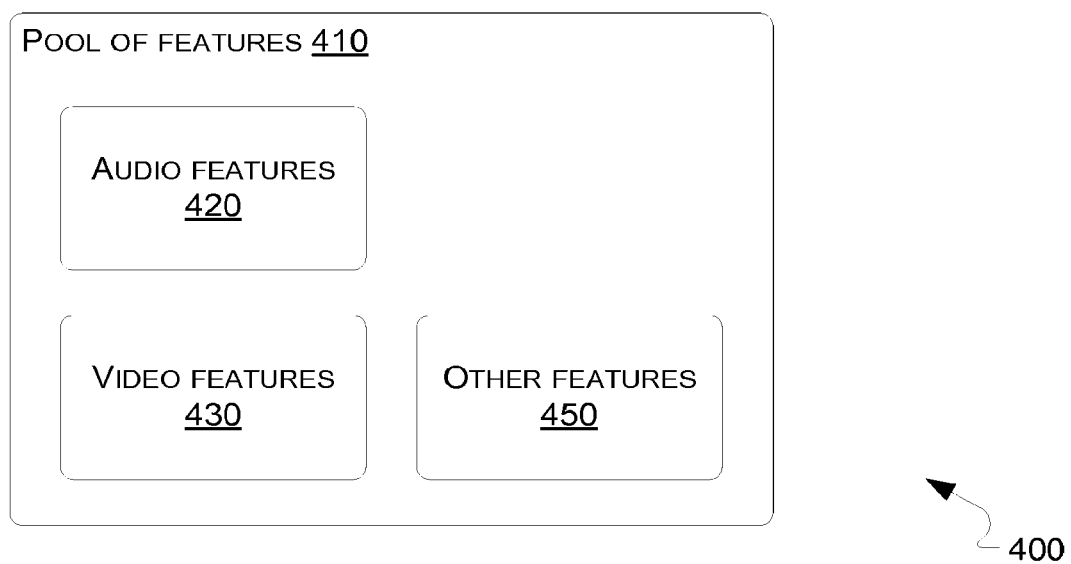
FIG. 4 illustrates an exemplary generalized diagram showing some exemplary features that might be identified and used in some implementations.

Turning now to FIG. 4, illustrated therein is an exemplary generalized diagram showing some exemplary features that might be identified and used in some implementations. This description of FIG. 4 is made with reference to FIG. 5 and FIG. 6. However, it should be understood that the elements described with reference to FIG. 4 are not intended to be limited to being used with the elements described with reference to these other figures. In addition, while the exemplary diagram in FIG. 4 indicates particular elements, in some implementations not all of these elements may exist, and in some implementations additional elements may exist.

The exemplary diagram 400 includes a pool of features 410 which may contain audio features 420, video features 430, and other features 450.

Generally, an audio feature is a feature associated with some type of audio input. Audio features might be created to reflect any number of a variety of audio parameters, including amplitude of an audio signal, frequency of an audio signal, and so on.

In an environment in which audio data includes a SSL likelihood function, audio features may use some set of information associated with the SSL likelihood function. In some implementations, a set of audio features based on a SSL likelihood function might use values from the SSL likelihood function associated with each detection window, along with global values for the entire SSL likelihood function. It may use these values at discrete points in time—for example, at the current time (the time for which SSL data is most recently available) or at any time in, say, the last minute—as well as aggregated over some period of time.

For example, suppose that the SSL likelihood function global maximum, global minimum, and global average are computed as follows: the global maximum ($L_{max}^g$) is the maximum value of the SSL likelihood function over the entire SSL likelihood function; the global minimum ($L_{min}^g$) is the minimum value of the SSL likelihood function over the entire SSL likelihood function; and the global average ($L_{avg}^g$) is the average value of the SSL likelihood function over the entire SSL likelihood function.

Also suppose that, for each detection window, some local values are computed, using the region of the SSL likelihood function that corresponds to the particular detection window (which may require converting the coordinate space used by the image and/or detection window to the coordinate space—possibly in degrees—used by the SSL likelihood function): the local maximum ($L_{max}^l$) is the maximum value of the SSL likelihood function in the detection window; the local minimum ($L_{min}^l$) is the minimum value of the SSL likelihood function in the detection window; the local average ($L_{avg}^l$) is the average value of the SSL likelihood function over the detection window; and the local middle output ($L_{mid}^l$) is the value of the SSL likelihood function at the midpoint of the detection window—for example, if the detection window comprises the degrees from 10° to 20°, the local middle output might be computed as the value of the SSL likelihood function at degree 15. Also suppose the existence of a "rest" maximum value ($L_{max}^{rest}$), which is the maximum value of the SSL likelihood function outside of the particular detection window.

Given these values, one might populate part of the pool of features 410 by adding audio features 420 defined at least in part by functions like those in the following list:

1. $\frac{L_{max}^l - L_{min}^g}{L_{max}^g - L_{min}^g}$

2. $\frac{L_{min}^l - L_{min}^g}{L_{max}^g - L_{min}^g}$

3. $\frac{L_{avg}^l - L_{min}^g}{L_{max}^g - L_{min}^g}$

4. $\frac{L_{mid}^l - L_{min}^g}{L_{max}^g - L_{min}^g}$

5. $\frac{L_{max}^l}{L_{min}^l}$

6. $\frac{L_{max}^l}{L_{avg}^l}$

7. $\frac{L_{min}^l}{L_{avg}^l}$

8. $\frac{L_{mid}^l}{L_{avg}^l}$

9. $\frac{L_{max}^l - L_{min}^l}{L_{avg}^l}$

10. $\frac{L_{max}^l}{L_{max}^g}$

11. $\frac{L_{min}^l}{L_{max}^g}$

12. $\frac{L_{avg}^l}{L_{max}^g}$

13. $\frac{L_{mid}^l}{L_{max}^g}$

14. $\frac{L_{max}^l - L_{min}^l}{L_{max}^g}$

15. $L_{max}^g - L_{max}^l < \varepsilon$ $\left(\begin{array}{l}\text{a binary feature that tests if the} \\ \text{detection window contains the global} \\ \text{peak of the SSL likelihood function}\end{array}\right)$ 16. $\frac{L_{max}^l}{L_{max}^{rest}}$ Another means for creating audio features might use the data from the SSL likelihood function in a fashion similar to that explained previously, but might use data from the function from one or more "previous" time periods rather than just from the "current" time period. For example, in addition to creating a set of audio features defined in part by the previously listed functions where the data used by the functions is the most recent data produced by the SSL likelihood function, additional features might be created where the data used by the functions is from one or more previous time periods. For example, the global maximum ($L_{max}^g$) value might remain the maximum value of the SSL likelihood function over the entire SSL likelihood function, but at a different time, perhaps, say, 1/60th of a second previous—using the second most recent SSL likelihood function values. Similar additional features might be created for an arbitrary number of previous time periods. For example, in an environment that provides a new SSL likelihood function every 1/60th of a second, features might be created that use the immediately previous sixty (60) SSL likelihood functions—if one created a feature for each of the sixteen (16) previously listed functions, this might result in nine hundred sixty (960) SSL audio features.

In addition to using the value of the SSL likelihood function at discrete points in time, some features might also be created that use some aggregate value derived from multiple previous SSL likelihood functions. For example, in some features, the global maximum ($L_{max}^g$) value might be defined as the absolute maximum value of the SSL likelihood function that occurred in, say, the previous second, rather than just the maximum value of the SSL likelihood function as provided by the most recent instance of the SSL likelihood function. Similarly, for example, the global average ($L_{avg}^g$) might be defined as the average value of the SSL likelihood function over all of the SSL likelihood functions for some previous period of time.

In addition to using data from previous SSL likelihood functions, it might also be possible to use data from "future" SSL likelihood functions, if the increased latency caused by waiting to capture this future data is acceptable.

Any or all of these additional features could then be added to the same pool of features 410 and used in the process of generating the classifier. One might also include other features based at least in part on the SSL likelihood function, or of course other features based on other audio data, or audio data combined with other data from other inputs.

Another set of features that might be a part of the pool of features 410 are video features 420. In general, a video feature may be any feature associated with some type of video input. A video feature might, for example, do some kind of mathematical operation on some or all of the pixels in an image, including the base image as well as other images, perhaps like the calculated short term difference and long term average images. Some specific details applicable to some implementations relating to the definition of video images are described in more detail below, for example with reference to FIG. 5 and FIG. 6.

Also included in the pool of features 410 may be other features 450. Such other features 450 comprise any additional features identified to be useful for consideration when generating a classifier. In some implementations, in environments in which there are other types of input, features associated with the other types of input might be part of the other features. For example, in an environment that includes input from a three-dimensional camera, such as some measure of the distance or depth to elements in an image, the other features might include features that quantify this additional data, either in isolation from other inputs, or perhaps in conjunction with other inputs. In the same or other implementations, other features might include features that use a combination of other inputs together—for example, some features might use both audio input and video input together, in the same feature or features.

In implementations where the inputs provide a 360° view, at least some features might be implemented so that they "wrap around"—that is, so that some features take into account input from, for example, both the "beginning" and "end" of the data provided by particular inputs. For example, in an environment that includes audio input that provides a 360° view, at least some features might incorporate input from, say, azimuth 355° to, say, azimuth 5°. Such features might in some cases capture people or speakers that happen to be located on the boundary between the "start" and "end" of the data provided by the inputs.

Figure 5:
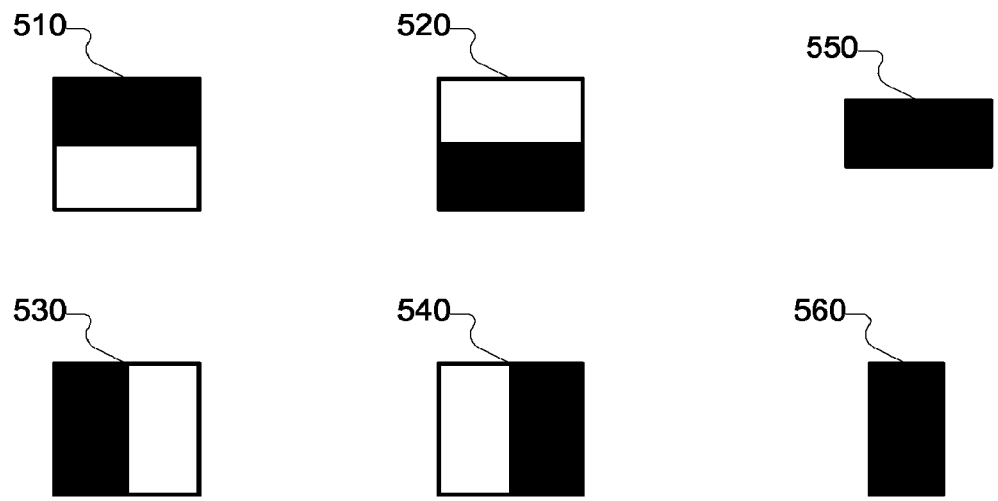
FIG. 5 illustrates some exemplary video features.

Turning now to FIG. 5, shown therein are some exemplary video features. This description of FIG. 5 is made with reference to FIG. 6, which discusses some manners in which video features may be used. However, it should be understood that the elements described with reference to FIG. 5 are not intended to be limited to being used with the elements described with reference to this other figure. In addition, while the exemplary diagram in FIG. 5 indicates particular elements, in some implementations not all of these elements may exist, and in some implementations additional elements may exist.

While video features may comprise any entity that is able to quantify some element of video input at a particular time, one useful type of video feature is that formed in part by one or more rectangles. Generally, the values associated with the pixels in one or more rectangles are summed or otherwise manipulated mathematically to determine a numeric value associated with a particular rectangular video feature. For example, in a black and white image where each pixel is either on or off (that is, a binary one (1) or zero (0)), the numeric value associated with a video feature might be, for example, the sum of the pixels that are on, or have the value of one (1), in the particular rectangle. In FIG. 5 the rectangle 550 and rectangle 560 illustrate graphically two possible single rectangle video features. In grayscale or color images, the numeric values associated with specific pixels may be manipulated similarly. For example, in a grayscale image where a numeric value associated with each pixel ranges from zero (0) to two hundred fifty five (255), a feature might be associated with the sum of the grayscale values for the pixels in a rectangle. Note that while rectangles are illustrated and discussed herein, the region or regions associated with a video feature may have any shape, and are not limited to rectangles.

Another kind of video feature may use two or more sub-rectangles inside of a parent rectangle. The rectangle 510, rectangle 520, rectangle 530, and rectangle 540 are all graphical examples of video features that use sub-rectangles. In such a video feature, the numeric value associated with the feature might be calculated by, for example, summing the values of the pixels in both of the sub-rectangles and then subtracting one of the resulting sums from the other sum. In such an implementation, depending on the location and orientation of the sub-rectangles, the resulting numeric value may be different, even when the features are applied to the same section of the image. For example, the sub-rectangles in parent rectangle 510 are oriented horizontally while the sub-rectangles of the parent rectangle 530 are oriented vertically, and so the resulting numeric value associated with video features that use these rectangles might be different, even when the rectangles are applied to the same part of an image. In some cases this type of feature may assist in identifying regions of high relative contrast—including the contrast that might exist, for example, between the eyes on a face (generally dark) and the surrounding skin (generally not as dark).

While FIG. 5 illustrates graphical representations of video features that include two sub-rectangles, it is also possible to define video features that include three rectangles, four rectangles, and so on. The numeric value associated with such video features may be computed in a variety of ways, including by taking the difference between the pixel counts in different sub-rectangles.

Figure 6:
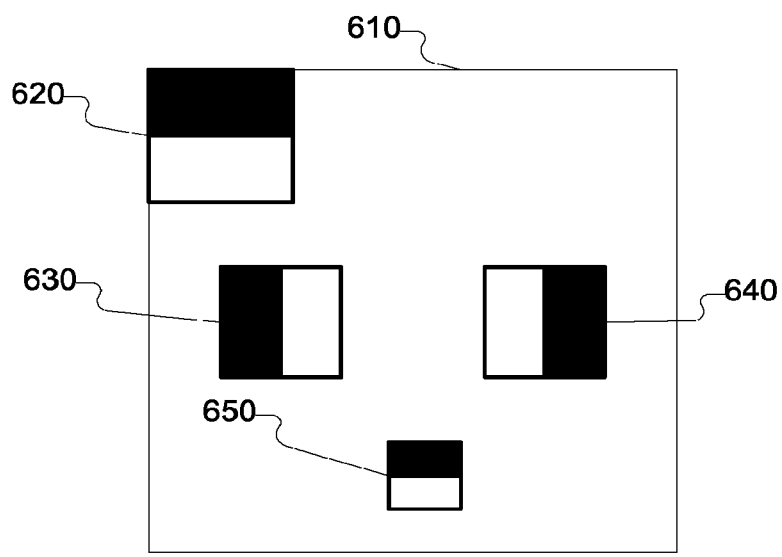
FIG. 6 illustrates a representative exemplary feature rectangle that includes some exemplary video features.

Turning now to FIG. 6, shown therein is a representative exemplary feature rectangle 610 that includes some exemplary video features. This description of FIG. 6 is made with reference to FIG. 1, FIG. 4, and FIG. 5. However, it should be understood that the elements described with reference to FIG. 6 are not intended to be limited to being used with the elements described with reference to these other figures. In addition, while the exemplary diagram in FIG. 6 indicates particular elements, in some implementations not all of these elements may exist, and in some implementations additional elements may exist.

While the illustrations in FIG. 5 show rectangles (and in some cases, sub-rectangles) associated with some exemplary video features, the illustrations in FIG. 5 do not explicitly show how the rectangles and corresponding video features might be used to generate or evaluate a classifier. One mechanism to identify the video features to be included in a pool of features is to take a variety of features that are associated with a variety of shapes, including ones like those described previously with reference to FIG. 5, and to vary the location and size of such shapes across a representative feature rectangle 610. The representative feature rectangle, and the location of the video feature's rectangle inside it, may then be evaluated over particular regions in an image at various times or for various purposes, including as part of a detection process.

Within the representative feature rectangle 610, the location and size of shapes associated with video features may be varied. For example, as shown, the parent rectangle 620 associated with a particular video feature occupies the upper-left hand corner of the representative feature rectangle. In addition to the particular location and size illustrated by the parent rectangle 620, the parent rectangle (and its sub-rectangles) might be moved both horizontally and vertically within the representative feature rectangle, each time defining a new video feature. In some implementations, the location of the parent rectangle may be changed a number of times in such a way so as to ensure that the entire representative feature rectangle has been covered. In the same or other implementations, when the location of the parent rectangle is changed, the new location may overlap the parent rectangle of the previously defined video feature or overlap the parent rectangles of already defined or to-be-defined video features.

Similarly, the size of the parent rectangle might also be modified to define new video features. For example, the parent rectangle 630, the parent rectangle 640, and the parent rectangle 650 show the use of different sizes, when compared to the parent rectangle 620. In some instances, it is conceivable that a parent rectangle might be scaled up until it occupies the entire representative feature rectangle.

In some implementations it may be useful to mimic the existence of a video feature with a particular parent rectangle using bilateral symmetry. That is, where one video feature exists with a parent rectangle in a particular location, it might be useful to define another video feature with a parent rectangle that is a mirror image of the parent rectangle of the first video feature. One exemplary case where this occurs is illustrated with the parent rectangle 630 and the parent rectangle 640.

In some implementations multiple video features may be generated that apply to different images, including the types of images described previously with reference to FIG. 1. For example, some video features may be generated to apply to the base image while other video features apply to the short term difference image and yet others to the long term average image.

After varying various factors including the location of the rectangles associated with video features, the size of the rectangles associated with video features, and the images to which video features are applied, and generating distinct video features for any or all combinations of these factors, it may not be uncommon to have literally thousands of video features that may be part of the pool of features, like the pool of features 410 described previously with reference to FIG. 4. In some implementations, some set of video features may be selected from this large number of video features during the process of generating a classifier.

It is important to note again that FIG. 5 and FIG. 6 do not show all possible video features. In many implementations video features will, in aggregate, cover an entire image or images. The video features shown in FIG. 5 and FIG. 6 serve only to demonstrate how some video features may be defined.

Figure 7:
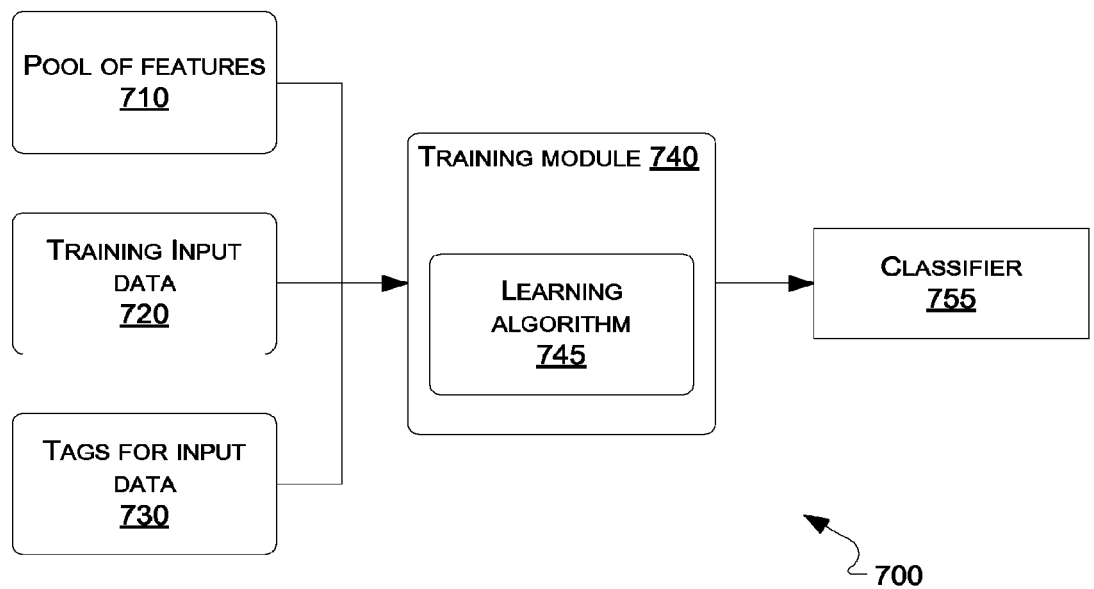
FIG. 7 illustrates an exemplary generalized diagram showing one system in which the generation of a classifier for person or speaker detection might be accomplished.

Turning now to FIG. 7, shown therein is an exemplary generalized diagram showing one system 700 in which the generation of a classifier for person or speaker detection might be accomplished. This description of FIG. 7 is made with reference to FIG. 3, FIG. 4, and FIG. 10. However, it should be understood that the elements described with reference to FIG. 7 are not intended to be limited to being used with the elements described with reference to these other figures. In addition, while the exemplary diagram in FIG. 7 indicates particular elements, in some implementations not all of these elements may exist, and in some implementations additional elements may exist.

The system 700 may include a pool of features 710, training input data 720, tags for input data 730, a training module 740 that is associated with a learning algorithm 745, and a classifier 755.

As introduced above in the operation flow described with reference to FIG. 3, given a pool of features, such as pool of features 710, it may be possible to generate a classifier that may be used to implement person or speaker detection. The system illustrated in FIG. 7 demonstrates some mechanisms by which such a classifier might be generated.

An exemplary training module 740 may use particular inputs to generate a classifier, such as classifier 755. The training module may be implemented in one or more computing devices, including the exemplary computing device described below with reference to FIG. 10.

In general, the training module may be associated with some form of learning algorithm. The learning algorithm comprises an automated process that produces a classifier. Some learning algorithms produce a classifier by accepting a pool of features 710, training input data 720, and tags for input data 730. The pool of features 710 may be a set of entities that may quantify some element or elements of input data, including the training input data 720. In some implementations, the pool of features may include features like those discussed previously with reference to FIG. 4 and other relevant figures. The training input data 720 may generally consist of input data like the input data that will be given to the classifier, once it has been generated. In some implementations, the training input data may include a set of video frames, from which images—like the base image, short term difference image, and long term average image—may be retrieved or calculated, as well as audio information from which an SSL likelihood function may be generated. The tags for input data 730 may generally consist of the "correct" answer that an ideal classifier would produce when given the training input data. For example, for each video frame and set of audio input, the tags for input data might identify particular regions within the video frame where people or speakers exist.

Given the pool of features 710, the training input data 720, and the tags for input data 730, the training module 740 may use its associated learning algorithm 745 to generate a classifier. The operation of the learning algorithm varies depending on the particular learning algorithm used, is generally known within the art and does not need to be explained in extensive detail in this application. For example, if the learning algorithm is a form of the Adaboost algorithm, the operation of the learning algorithm may include selecting a series of features such that the accuracy of the resulting classifier improves as the Adaboost algorithm proceeds. If the learning algorithm is something aside from the Adaboost algorithm, such as, for example, a neural net, the operation of the learning algorithm may be different.

The ultimate output of the training module 740 and the learning algorithm 745 may include a classifier that, when evaluated over a particular region or detection window, returns some estimate of the likelihood that the particular region includes a person or speaker. The classifier itself may generally be made up of a subset of features that have been selected by the training module. The set of the selected features generally perform somewhat more accurately than the features that are not selected. In some cases the elements of the classifier, including the subset of features, are referred to as "nodes," where, for example, each selected feature is associated with a single node of the classifier.

Different features in the classifier 755 may require different amounts of computation time to evaluate or compute during detection. For example, some features—like at least audio features in some implementations—may be capable of being evaluated or computed more quickly than other features—like at least some video features in some implementations. Because of differences in evaluation speed, it may be useful in some implementations to order particular features in the generated classifier such that a feature that requires less time to evaluate is ordered before a feature that requires more time to evaluate.

Some of the selected features in the classifier 755 may do a relatively better job of identifying a person or speaker in a detection window than other selected features. For example, it may be that a particular audio or video feature is more highly correlated with the detection of a person or speaker than some other audio or video feature. In some implementations it may be useful to order features of the classifier such that at a feature that is more highly correlated with person detection occurs before a relatively less accurate feature.

Regardless of whether it is related to speed of evaluation, the degree of accuracy, or some other property, particular features may be ordered before other features using a variety of mechanisms. In some implementations the learning algorithm itself may take desirable or preferable attributes—including speed of evaluation and degree of accuracy—into account when generating the classifier, perhaps by weighting particular or preferable features more highly than other features, which might result in the particular features tending toward occurring earlier in the generated classifier. In the same or other implementations, the features in the generated classifier may be re-ordered or sorted after the learning algorithm has generated a classifier.

Generally, the more training input data 720 that is used to generate the classifier 755, the more accurate the resulting classifier will be. However, producing training input data requires time and effort—for example, among other things, the "correct" answers, in the form of tags for input data 730, might need to be generated for each frame of video. One method for increasing the amount of training input data that may require relatively less work than producing entirely new training input data is to create mirror images of already existing training input data and tags for input data. For example, given a video frame and an SSL likelihood function, one might create a new video frame that is the mirror image of the original video frame and also mirror the SSL likelihood function and tags for input data.

In at least some implementations some features may be selected, at least in part, so that "false positives" are, in many cases, associated with another person and not with an object or entity that is not a person. That is, in the cases where the desired person or speaker is not detected, features may be selected so that, in many cases, another person is detected rather than some object or entity that is not a person. For example, video features might be selected so that, where the speaker is not detected, in many cases, a non-speaking person is detected.

Figure 8:
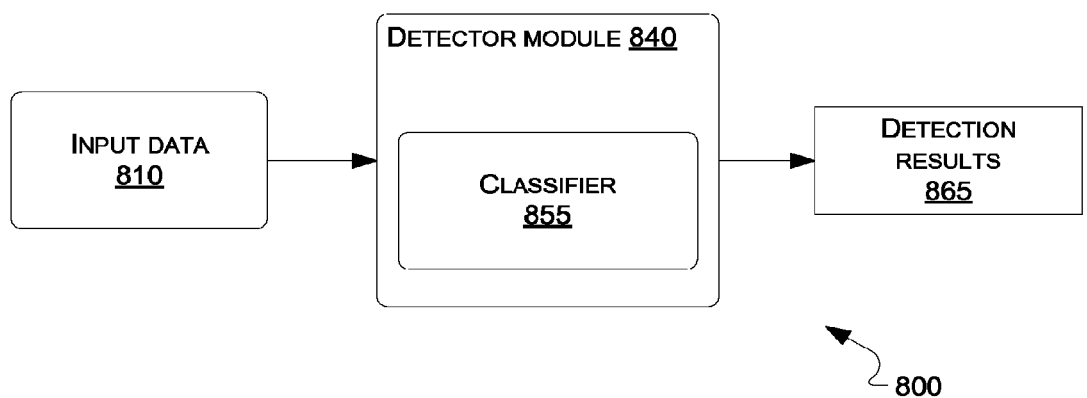
FIG. 8 illustrates an exemplary generalized diagram showing one system in which the detection of people or speakers might be accomplished.

Turning now to FIG. 8, shown therein is an exemplary generalized diagram showing one system 800 in which the detection of people or speakers might be accomplished. This description of FIG. 8 is made with reference to FIG. 1, FIG. 3, FIG. 7, FIG. 9, and FIG. 10. However, it should be understood that the elements described with reference to FIG. 8 are not intended to be limited to being used with the elements described with reference to these other figures. In addition, while the exemplary diagram in FIG. 8 indicates particular elements, in some implementations not all of these elements may exist, and in some implementations additional elements may exist.

The system 800 may include input data 810, a detector module 840 associated with a classifier 855, and detection results 865.

As introduced above in the operation flow described with reference to FIG. 3, given a classifier 855, including one like the generated classifier 755 of FIG. 7, a detector, perhaps implemented in a detector module 840, may examine input data 810 and use the classifier to produce detection results 865. The system illustrated in FIG. 8 demonstrates some mechanisms by which such a classifier might be used to detect people or speakers. The detector module may be implemented in one or more computing devices, including the detector device 165 described previously with reference to FIG. 1, and the exemplary computing device described below with reference to FIG. 10.

The input data 810 may include a wide variety of input data. In some implementations the input data may include input data like that described previously, for example with reference to FIG. 1, including a series of video frames, from which a series of base images, short term difference images, and long term average images may be determined. The input data may also include audio data like a series of SSL likelihood functions that are associated with one or more video frames. The input data may also include other types of data, including those described previously, for example with reference to FIG. 1.

The detector module 840 may then use the classifier 855 to determine regions of the input video data may include a person or speaker. In some implementations this may be accomplished by subdividing at least part of the input data into a series of smaller regions, called detection windows. The detection windows may be defined in a variety of ways, including some methods discussed below in more detail with reference to FIG. 9.

For each detection window, the detector module 840 may evaluate the classifier 855 against the input data for that detection window. The evaluation of the classifier may generally produce some estimate of the likelihood that a person or speaker exists in the particular detection window. This estimate of likelihood may, at least in some implementations, be part of the detection results 865.

Once some number, or all, of the detection windows have been evaluated, in some implementations a merging operation may take place to determine particular regions of the input data that are especially likely to contain people or speakers. This may be accomplished in some implementations by choosing regions that have a relatively large number of detection windows that in turn have a high likelihood of containing people or speakers. These identified regions may also, at least in some implementations, be part of the detection results 865.

In some implementations, all of the elements, or nodes, of a classifier may be evaluated before the likelihood that the particular detection window contains a person or speaker is fully determined. In some implementations it may be possible to shorten the time required to evaluate the classifier for some detection windows using a technique called "pruning."

When pruning is used, the evaluation of the classifier may be stopped before all nodes in the classifier have been evaluated. The evaluation of the classifier may be stopped, for example, if it can be determined that the already calculated results provide some level of certainty that a particular detection window does or does not contain a person or speaker. For example, it may be known that if, say, the first four nodes in the classifier all evaluate to particular results, that the detection window always contains a person (at least for the data used to train the classifier). In this instance, during the detection process the evaluation of the classifier may be stopped before all nodes have been evaluated, and the detection window may be determined to contain a person or speaker.

In some implementations, particular sub-regions of the input data may be excluded from the regions considered for people or speaker detection. For example, a room might have a television or projector screen that may in some cases display people or speakers that should not be identified as people or speakers by the detector. In this exemplary case, a sub-region of the input data associated with the television or projector screen may be excluded from the regions considered for people or speaker detection. This may be accomplished in a variety of ways including by, for example, not defining detection windows that encompass the sub-regions to be excluded.

Figure 9:
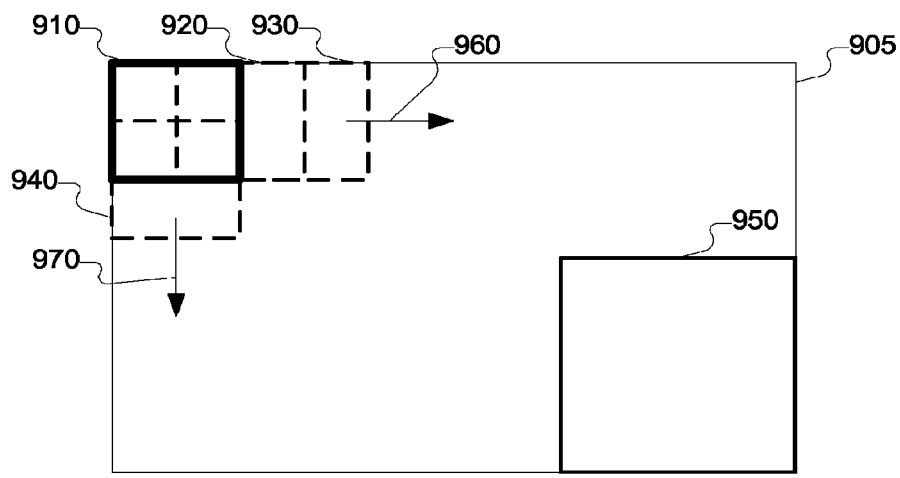
FIG. 9 illustrates some exemplary representations of detection windows that may be used as part of the process of detecting people or speakers.

Turning now to FIG. 9, shown therein are some exemplary representations of detection windows that may be used as part of the process of detecting people or speakers. This description of FIG. 9 is made with reference to FIG. 6 and is related to the discussion provided for FIG. 8. However, it should be understood that the elements described with reference to FIG. 9 are not intended to be limited to being used with the elements described with reference to these other figures. In addition, while the exemplary diagram in FIG. 9 indicates particular elements, in some implementations not all of these elements may exist, and in some implementations additional elements may exist.

In some implementations input data, like a video frame, or an image or images derived from a video frame, may be subdivided into multiple detection windows that are used as part of the process of detecting people or speakers.

As shown in FIG. 9, an exemplary image 905 may contain multiple exemplary detection windows, including detection window 910, detection window 920, detection window 930, detection window 940, and detection window 950. Each detection window occupies some portion of the image. It is important to note that not all detection windows that might exist in the image 905 are shown. In many implementations detection windows will, in aggregate, cover the entire image. The detection windows shown in FIG. 9 serve only to demonstrate how detection windows may be defined. Furthermore, while the detection windows are shown as rectangles, detection windows may be defined in any shape. Also, while the detection windows are described with reference to an "image," detection windows also may apply to non-visual input, including audio input, as has been described previously. For example, a detection window for an SSL likelihood function associated with audio input may include some subset of the SSL likelihood function.

The exemplary detection window 910 occupies the upper left-hand corner of the image 905. Exemplary detection window 920 and exemplary detection window 930 show one manner in which detection windows may be extended to cover more regions of the image. Although not shown, detection windows may be defined that continue in the direction represented by the arrow 960. Such detection windows may cover the entire top portion of the image.

Similarly, exemplary detection window 940 shows how detection windows may extend vertically to cover additional regions of the image. The arrow 970 illustrates one direction in which such detection windows might continue, to cover the entire left portion of the image.

By extending the exemplary detection window 940 to the right, so that there are detection windows below the exemplary detection window 920, the exemplary detection window 930, and in the direction shown by the arrow 960, illustrates one way in which detection windows may be defined so that they cover the entire image 905.

Detection windows may overlap to any degree. For example, as shown, half of the detection window 920 overlaps the detection window 910. In addition to the overlap shown, in panoramic images that represent a 360° view, detection windows may also overlap off the ends of the image 905. For example, a detection window, not shown, might occupy the very right side of the image and the very left side of the image.

In some implementations, detection windows of various sizes may be used. For example, the detection window 950 is larger than the detection window 910. In some implementations detection windows may be used at many different sizes. For example, in one implementation, detection windows of 10 different sizes may be used. Each set of same-sized detection windows may be extended to cover the entire image 905, using, for example, the same process as explained previously with reference to the detection window 910 and other detection windows that are the same size as detection window 910.

Some video features may use a representative feature rectangle, as discussed previously with reference to FIG. 6. During the detection process the representative feature rectangle may be scaled to fit in the detection window, and any video feature associated with the representative feature rectangle may be scaled proportionally at the same time. For example, suppose an exemplary representative feature rectangle of size 50 pixels wide by 50 pixels tall that contains, among many video features, a video feature with a rectangle of size 10 pixels wide by 20 pixels tall. If this representative feature rectangle is used with a detection window of the same size, the video feature's rectangle might also stay the same size. If the representative feature rectangle is used with a detection window that is four times as large—for example, with a detection window of size 100 pixels wide by 100 pixels tall—then the representative feature rectangle and its associated video feature rectangle might also be scaled to fit the larger detection window. In this example, the video feature's rectangle might be scaled to a size of 20 pixels wide by 40 pixels tall.

In some implementations, the size and/or orientation of the space or room where a detector is used may influence the size of the detection windows used in the detection process. For example, in a small room, the physical characteristics associated with people or speakers—like faces or torsos—may tend to be large when viewed from the perspective of the one or more input devices, or may tend to vary in size to a smaller degree than the physical characteristics associated with people or speakers in a large room. This may occur because, in a small room, people or speakers may only be a relatively small distance from the one or more input devices—perhaps resulting in larger faces, for example—while in a larger room people or speakers may be close to or far from the one or more input devices, and so the size of associated physical characteristics may vary to a greater degree. As a result, in some implementations, detection windows may be used such that, in small rooms for example, detection windows may be limited to larger sizes, and perhaps may range in size by relatively small amounts. In contrast, in larger rooms, detection windows may range from small to large so as to attempt to capture a wider variation in the sizes of physical characteristics.

Example Computing Environment

Figure 10:
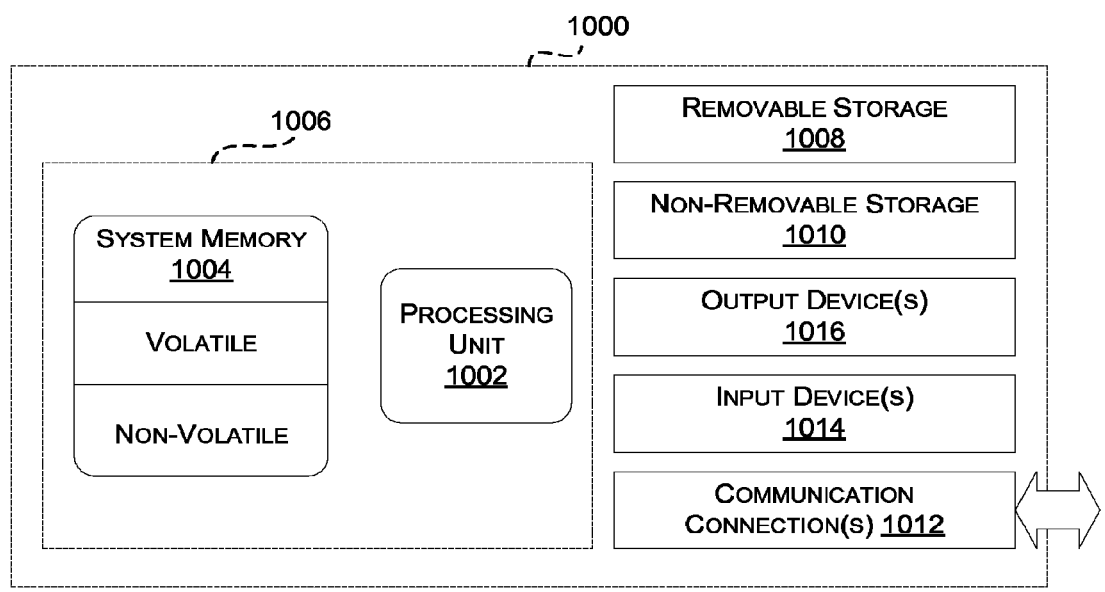
FIG. 10 illustrates an exemplary computer device in which the various technologies described herein may be implemented.

Turning now to FIG. 10, this figure and the related discussion are intended to provide a brief, general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 1000 illustrated in FIG. 10.

Generally, program modules include routines, programs, objects, components, user interfaces, data structures, etc., that perform particular tasks, display particular information, or implement particular abstract data types. Operations performed by the program modules have been described previously with the aid of one or more block diagrams and operational flowcharts.

Those skilled in the art can implement the description, block diagrams, and flowcharts in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 1000 illustrated in FIG. 10, in its most basic configuration, includes at least one processing unit 1002 and memory 1004. In some implementations, the processing unit 1002 may be a general purpose central processing unit (CPU), as exists, for example, on a variety of computers, including desktop and laptop computers. In other implementations, the processing unit may also be a digital signal processor (DSP) that may be especially suitable for digital signal processing tasks, including those performed, for example, by a detector device like the detector device 165 described previously with reference to FIG. 1. Depending on the exact configuration and type of computing device, the memory 1004 may be volatile (such as RAM), non-volatile (such as ROM, flash memory, etc.), or some combination of the two. This most basic configuration is illustrated in FIG. 10 by dashed line 1006. Additionally, the computing device 1000 may also have additional features and functionality. For example, the computing device 1000 may also include additional storage (removable and/or non-removable) including, but not limited to, magnetic or optical disks or tape. Such additional storage is illustrated in FIG. 10 by the removable storage 1008 and the non-removable storage 1010.

The computing device 1000 may also contain one or more communications connection(s) 1012 that allow the computing device 1000 to communicate with other devices and services. For example, the computing device might have one or more connections to other computing devices, including, for example, the auxiliary device 175 described previously with reference to FIG. 1. The computing device 1000 may also have one or more input device(s) 1014 such as an image input devices like cameras or scanners, keyboards, mice, pens, voice input devices including microphone arrays, touch input devices, and so on. One or more output device(s) 1016 such as a display, speakers, printer, and so on, may also be included in the computing device 1000.

Those skilled in the art will appreciate that the technologies described herein may be practiced with computing devices other than the computing device 1000 illustrated in FIG. 10. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 10, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method, comprising:
identifying a pool of features from multiple types of input, the pool of features comprising a first video feature from a video input, the first video feature comprising a parent rectangle within a feature rectangle in an image of the video input;
calculating a numeric value associated with the first video feature by summing values of pixels in the parent rectangle; and
generating a classifier for speaker detection using a learning algorithm wherein nodes of the classifier are selected using the pool of features, based on the numeric value associated with the first video feature.

2. The method of claim 1, the parent rectangle comprising two or more sub-rectangles.

3. The method of claim 2, the two or more sub-rectangles comprising a first sub-rectangle and a second sub-rectangle, the numeric value calculated by summing values of pixels in each of the first sub-rectangle and the second sub-rectangle, and subtracting a sum for the first sub-rectangle from a sum for the second sub-rectangle.

4. The method of claim 1, comprising defining a second video feature by moving the parent rectangle within the feature rectangle.

5. The method of claim 4, a location of the parent rectangle in the second video feature overlapping a location of the parent rectangle in the first video feature.

6. The method of claim 1, comprising defining a second video feature using bilateral symmetry to minor the first video feature.

7. The method of claim 1, comprising defining a second video feature by modifying a size of the parent rectangle.

8. The method of claim 1, comprising defining a second video feature within a short-term difference image or a long-term difference image calculated based on the image of the video input.

9. An apparatus, comprising a detector device including a detector configured to accept multiple types of input, the multiple types of input comprising a video input, the detector configured to evaluate a person detection classifier to detect a person, the person detection classifier created by:
  identifying a pool of features from the multiple types of input, the pool of features comprising a first video feature from the video input, the first video feature comprising a parent rectangle within a feature rectangle in an image of the video input;
  calculating a numeric value associated with the first video feature by summing values of pixels in the parent rectangle; and
  generating the classifier for speaker detection using a learning algorithm wherein nodes of the classifier are selected using the pool of features, based on the numeric value associated with the first video feature.

10. The apparatus of claim 9, the parent rectangle comprising two or more sub-rectangles.

11. The apparatus of claim 10, the two or more sub-rectangles comprising a first sub-rectangle and a second sub-rectangle, the numeric value calculated by summing values of pixels in each of the first sub-rectangle and the second sub-rectangle, and subtracting a sum for the first sub-rectangle from a sum for the second sub-rectangle.

12. The apparatus of claim 9, creation of the person detection classifier comprising defining a second video feature by moving the parent rectangle within the feature rectangle.

13. The apparatus of claim 12, a location of the parent rectangle in the second video feature overlapping a location of the parent rectangle in the first video feature.

14. The apparatus of claim 9, creation of the person detection classifier comprising defining a second video feature using bilateral symmetry to mirror the first video feature.

15. The apparatus of claim 9, creation of the person detection classifier comprising defining a second video feature by modifying a size of the parent rectangle.

16. The apparatus of claim 9, creation of the person detection classifier comprising defining a second video feature within a short-term difference image or a long-term difference image calculated based on the image of the video input.

17. A computer-readable storage device containing instructions that when executed cause one or more processors to:
  identify a pool of features from multiple types of input, the pool of features comprising a first video feature from a video input, the first video feature comprising a parent rectangle within a feature rectangle in an image of the video input;
  calculate a numeric value associated with the first video feature by summing values of pixels in the parent rectangle; and
  generate a classifier for speaker detection using a learning algorithm wherein nodes of the classifier are selected using the pool of features, based on the numeric value associated with the first video feature.

18. The computer-readable storage device of claim 17, the parent rectangle comprising a first sub-rectangle and a second sub-rectangle, the numeric value calculated by summing values of pixels in each of the first sub-rectangle and the second sub-rectangle, and subtracting a sum for the first sub-rectangle from a sum for the second sub-rectangle.

19. The computer-readable storage device of claim 17, containing instructions that when executed cause one or more processors to define a second video feature by moving the parent rectangle within the feature rectangle or by modifying a size of the parent rectangle.

20. The computer-readable storage device of claim 17, containing instructions that when executed cause one or more processors to define a second video feature within a short-term difference image or a long-term difference image calculated based on the image of the video input.

\* \* \* \* \*